United States Patent Office 3,429,231
Patented Feb. 25, 1969

3,429,231
FLUID MOTOR
Robert E. Raymond, Zanesville, Ohio, assignor to International Basic Economy Corporation, New York, N.Y., a corporation of New York
Filed Apr. 18, 1966, Ser. No. 543,284
U.S. Cl. 91—175         10 Claims
Int. Cl. F01b *3/00;* F01l *33/02;* F15b *11/08*

ABSTRACT OF THE DISCLOSURE

A fluid motor of the axial piston type that includes inlet check valves which are inoperative when the mechanism operates as a fluid but which automatically become operative during overrun conditions when the mechanism must function as a pump to perform a braking function. The motor further includes cylinder chamber relief valves that prevent pressure build-up in the cylinder chambers when valving is being effected. In addition the motor includes a cylinder barrel mounted for axial movement relative to a spool type timing valve as well as pulsating means for vibrating the cylinder barrel to reduce break away friction and eliminate hydraulic locking effects on the pistons and timing valve.

---

The present invention relates generally to hydraulic machines and particularly to a novel improved axial piston type fluid motor.

The fluid motor of the present invention comprises novel structural improvements which are particularly adaptable for incorporation into a fluid motor such as described in my co-pending application Ser. No. 244,091 filed Dec. 12, 1962, now Patent No. 3,246,575 and will be described with reference to such a fluid motor. However, it should be pointed out that other axial piston types of fluid motors may also be adapted to incorporate the novel combination of the present invention.

In general, the fluid motor of the present invention comprises a housing means that forms an envelope for a novel removable cartridge-type motor mechanism which uniquely incorporates a removable and integral assembly of components which are described in detail in the above mentioned co-pending application.

In addition to the novel structure referred to above, the present invention includes the following novel improvements:

(1) Pistons in the cylinders that include novel inlet check valves which are inoperative when the mechanism operates as a fluid motor but which automatically become operative during overrun conditions when the mechanism must function as a pump to perform a braking function.

(2) Novel cylinder chamber relief valves to prevent high pressure build-up in the cylinder chamber when valving is being effected. This novel feature reduces the fatigue and noise caused by the momentary extremely high pressures that can build up due to the instantaneous transition periods occurring between the opening and closing of successive inlets in the timing valve means.

(3) A cylinder barrel mounted for axial movement relative to a piston or spool valve to enable dithering of the barrel to overcome mechanical and/or hydraulic side forces. This vibration or dither reduces breakaway friction and eliminates hydraulic locking effects on both the pistons and timing valve.

In addition to the above listed components of the integrally removeable cartridge type motor mechanism, the apparatus further includes transfer valve members that form inlet and outlet passages that lead from the exterior of the housing means to the cartridge assembly.

As another aspect of the present invention the above described cartridge assembly is supported in the housing means by axially extending barrel bearings that serve to transmit torque reaction forces from the motor cartridge to the housing means. In addition, these barrel bearings mount the cylinder barrel for axially vibratory movement for the purpose of eliminating breakaway friction and hydraulic locking effects.

As another aspect of the present invention, the fluid motor comprises an annular piston mounted for vibratory movement in a cylinder formed by the housing means, said piston being in force transmitting relationship with the cylinder barrel to provide means for vibrating or dithering the barrel relative to the pistons and timing valve member. This vibration or dither reduces breakaway friction and eliminates hydraulic locking effects on both the pistons and timing valve.

It is therefore an object of the present invention to provide an improved cartridge type motor apparatus that combines the basic motor components in an integral and removeable assembly that can readily be incorporated in various envelopes or frame portions of related mechanisms.

It is another object of the present invention to provide an apparatus of the type described that comprises a cylinder barrel that includes an integrally formed annular manifold means and which supports reaction plugs that serve the dual function of dividing the manifold means into intake and exhaust chambers and transmitting axial piston reaction forces to the housing means.

It is another object of the present invention to provide an apparatus of the type described that comprises pistons provided with inlet check valves that cooperate with the timing valve member to prevent starvation of the motor under overrun conditions, that is, when the fluid motor must act as a pump.

It is another object of the present invention to provide an apparatus of the type described that comprises novel cylinder chamber relief valves to prevent instantaneous high pressures from building up in the cylinder barrel during transition periods between the opening and closing of successive timing valve inlets. This feature reduces fatigue in the walls of the cylinder chambers and substantially reduces the noise level of the motor.

It is another object of the present invention to provide an apparatus of the type described that comprises a timing valve member mounted in the center of a cartridge mechanism and adapted to supply and drain fluid between a surrounding annular manifold means and a surrounding array of axially extending cylinders.

It is another object of the present invention to provide an apparatus of the type described that comprises and utilizes a timing valve member as part of a mechanism for axially biasing a plurality of pistons against a driven eccentric.

It is another object of the present invention to provide an apparatus of the type described that comprises and utilizes a timing valve member that is rotatably mounted in a cartridge type motor mechanism and driven by a flexible disengageable connection with an output shaft means such that the cartridge and timing mechanism can be removed as a unit from the housing means.

It is another object of the present invention to provide an apparatus of the type described that comprises a cartridge type motor mechanism that includes a reaction plug and reaction plate subassembly which provides means for transmitting piston reaction forces to the housing and which also serves to hold together the components of the cartridge when it is removed from the housing means.

It is another object of the present invention to provide an apparatus of the type described that comprises a cartridge type motor mechanism that incorporates reaction pins for hydraulically biasing the pistons against a cam and output shaft assembly journaled in the housing means.

It is another object of the present invention to provide an apparatus of the type described that comprises transfer valve members that provide inlet and outlet passage means that connect the cartridge type motor mechanism with the exterior of its housing. These transfer valve members form a self aligning surface contact seal with the cartridge and thereby provides an assembly that is insensitive to minor disalignments.

It is another object of the present invention to provide an apparatus of the type described that comprises a cartridge type motor apparatus that includes an axially shiftable cylinder barrel in driven engagement with a dithering cylinder. This provides novel means for reducing breakaway friction and eliminating hydraulic locking effects.

Further objects and advantages of the present invention will be apparent from the following description, reference being had to the accompanying drawings wherein a preferred form of embodiment of the invention is clearly shown.

Figure 5:
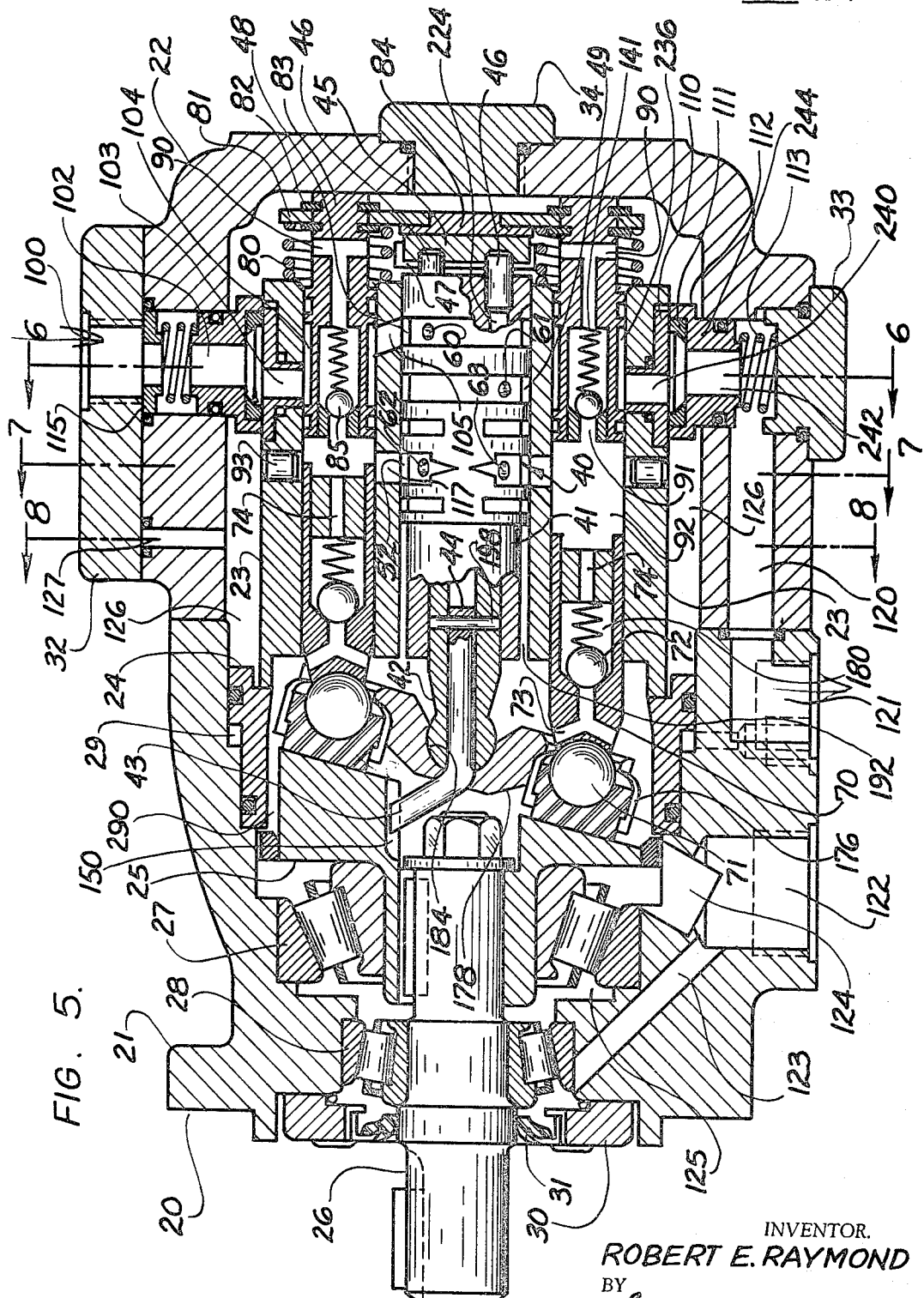
FIG. 5 is a side sectional view of a fluid motor constructed in accordance with the present invention, the section being taken along a vertical plane through the center line of the apparatus.

Referring in detail to the drawings, FIG. 5 illustrates a fluid motor apparatus constructed in accordance with the present invention that includes a housing 20 which comprises a front housing portion 21 and a rear housing portion 22. Housing portions 21 and 22 are joined together by a plurality of axially extending threaded studs, not illustrated.

An output shaft 26 is rotatably supported in housing 20 by roller bearing assemblies 27 and 28 and an oil seal assembly 30 engages the periphery of shaft 26 at a resilient sealing element 31.

With continued reference to FIG. 5, an eccentric 26 is keyed to the inner end of shaft 26.

Cam 25 and shaft 26 are described in detail in my co-pending application S.N. 244,091 now Patent No. 3,246,575.

Referring particularly to FIGS. 5 through 8, a cartridge type motor mechanism comprises a cylinder barrel 23 that is mounted for axial vibratory movement in housing 20 by two barrel bearings 116, the outer surfaces of which conform with housing grooves 160 and barrel grooves 162.

Cylinder barrel 23 includes a plurality of axially extending cylinders 92 in which are slideably mounted a plurality of pistons 70.

As seen in FIG. 5, each of the pistons 66 comprises a ball shaped end portion 71 that fits into a socket portion 72, a piston foot member 74 formed of resinous material, such as nylon or the like, encased in a cup-shaped housing 76. Such composite piston foot construction is described in detail in my co-pending application Ser. No. 167,030 filed Jan. 18, 1962, now United States Letters Patent No. 3,221,564 issued Dec. 7, 1965.

Figure 4:
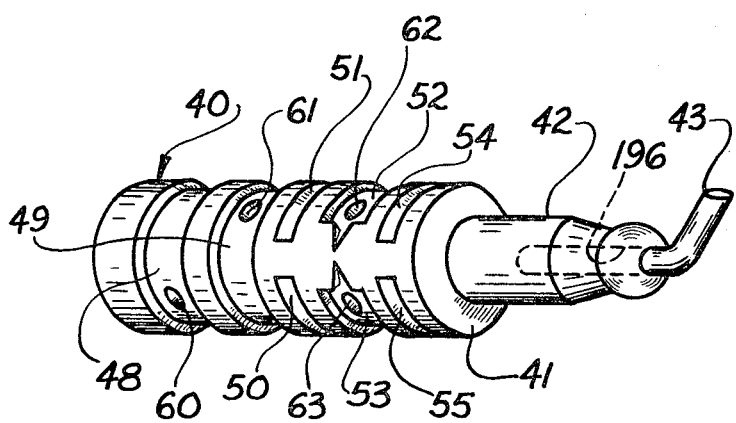
FIG. 4 is a perspective view of a portion of the apparatus of the present invention illustrating the timing valve member which is shown in isolated relationship from the remainder of the apparatus.

The construction of the piston foot housings 176, yoke member 178 and the relationship with timing valve member 40, illustrated in isolated relationship in FIG. 4 is described in detail in my co-pending application Ser. No. 244,091 which is incorporated herein by reference and therefore said components will only be discussed in general as needed to illustrate their relationship to the novel improvements of the present invention.

Timing valve member 40 includes an end portion 42 which includes a ball-shaped outer end which is received by a socket 184 in yoke 178.

Valve member 40 is rotatably driven in a valve chamber 192 that extends axially through cylinder barrel 23 by means of a valve driver 44 secured in hole 196 by a press fit pin 198. Valve driver 44 includes an outer arm 43 disposed freely in a valve driver slot 150.

Referring specifically to FIG. 4, valve member 40 comprises a spool 41 provided with a rear annular pressure recess 48, an intermediate annular drain recess 49, a front arcuate pressure recess 53, and a front arcuate drain recess 52.

Pressure recess 48 releases fluid via intake port 100, a hole 102 in a transfer valve 115, hole 103 in barrel 23, a manifold pressure passage 104 and hole 105 in barrel 23.

The pressurized fluid from pressure recess 48 is sequentially delivered to the cylinders 92 via spool passages 60, 226, 62, arcuate spool recess 52, and barrel passages 117.

Cylinders 92 are sequentially drained in a similar manner as described in my co-pending application, Ser. No. 244,091, via barrel passages 217, arcuate drain recess 53, spool passages 63, 224, 61, annular drain recess 49, manifold drain passages 236, a barrel passage 240, a hole 242 in transfer valve 244, and outlet passage 120, and a drain port 121.

Timing valve 40 is hydraulically balanced in an identical manner as described in my co-pending application by means of two arcuate pressure balance recesses 51 and 54 located on the opposite side of the valve from main pressure recess 106, and by two arcuate drain balance recesses 50 and 55 located on the opposite side of the valve from main drain recess 108.

Referring again to FIG. 5, valve member 40 is utilized as a link in the mechanism that pressure biases the pistons 66 against the eccentric 25 by slideably mounting two reaction pins 46 in holes drilled into the ends of valve member 40. The reaction pins 46, a spool bearing portion 45, and a metal reinforcing cup 47 are again shown and described in detail in my co-pending application Ser. No. 244,091 now Patent No. 3,246,575.

As best seen in FIG. 5, the above referred to construction includes a rear spool bearing portion 84 mounted in the center of a reaction plate 81.

Reaction plate 81 is provided with a plurality of peripherally spaced holes that receive the rear ends of a plurality of reaction plugs 83, plate 81 being located on the reaction plug ends by snap rings 82.

The front ends of the reaction plugs 83 are disposed in cylinders 92 and serve to transmit axial reaction forces from barrel 23 to housing 20.

Compression springs 80 are disposed between the barrel 23 and reaction plate 81 and serve to provide a biasing force for dithering the barrel 23 against the force provided by an annular piston which will be described in detail later herein.

It should be pointed out that timing valve member 40, yoke 178 and the piston feet can, without departing from the spirit of the present invention, be mechanically biased toward cam 25 by replacing reaction pins 46 with a compression spring interposed between the rear end of valve member 40 and the confronting valve bearing members 45 and 84.

Referring again to FIGS. 5 and 6, transfer valve members 112 and 244 are pressure biased against flat barrel surfaces 110 by compression springs 113. A spring retainer 115 retains spring 113 in place on valve 112 and a plug 33 functions as a spring retainer for spring 113 on valve 244. A nylon seal 111 is disposed between surfaces 110 and transfer valves 112 and 244.

As best seen in FIG. 5, the front of housing 20 forms an annular cylinder 29 that slideably mounts an annular cylinder 24, the latter including a shoulder 206 in force transmitting relationship with the front end of cylinder barrel 23.

Figure 1:
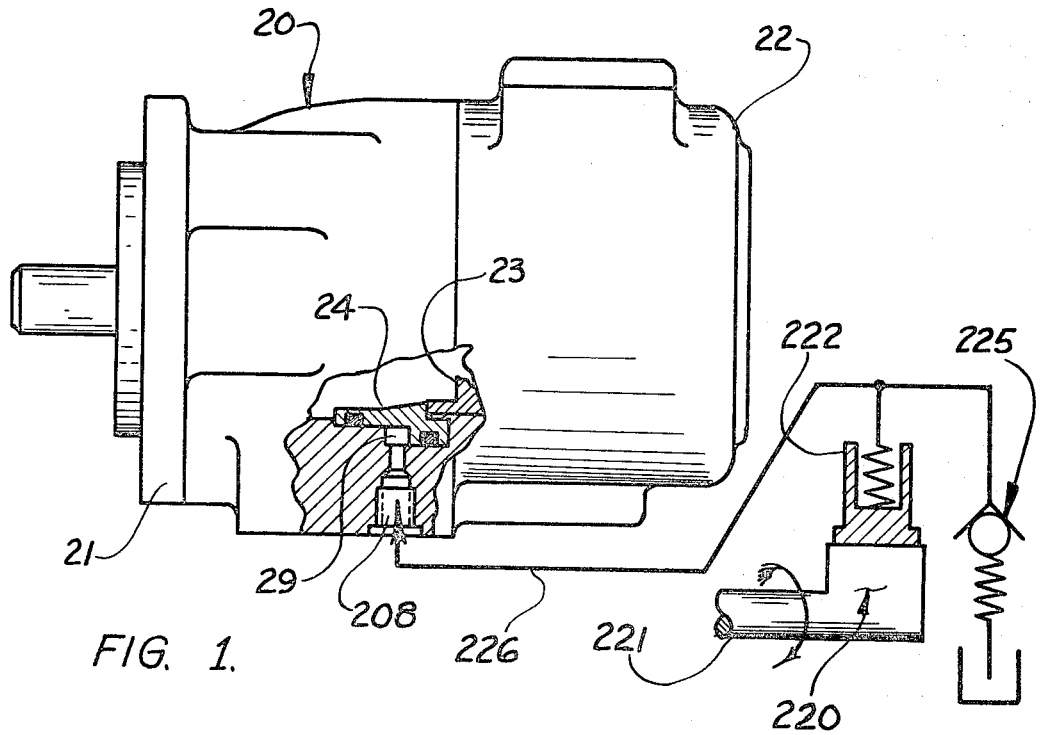
FIG. 1 is a diagrammatic view of hydraulic pulsating means which may be used to vibrate or dither the cylinder barrel of the fluid motor of the present invention.

As diagrammatically illustrated in FIG. 1, annular cylinder 29 is connected to a pulsating means which may be in the form of a pulsating fluid source, indicated generally at 220. A shaft and cam means 221 drives a spring biased piston and cylinder assembly 222 to send a pressure pulse via line 226 to a port 208 which is connected to annular cylinder 29. A relief valve 225 may be provided to determine the maximum pressure fed to port 208. When this pressure is exceeded the fluid then may dump to tank.

In this manner the pulsating pressure source sends impulses to annular cylinder 29 which are transmitted to cylinder barrel 23 by annular piston 24. Barrel 23 is biased toward annular cylinder 29 by the force of previously mentioned compression springs 80.

Figure 6:
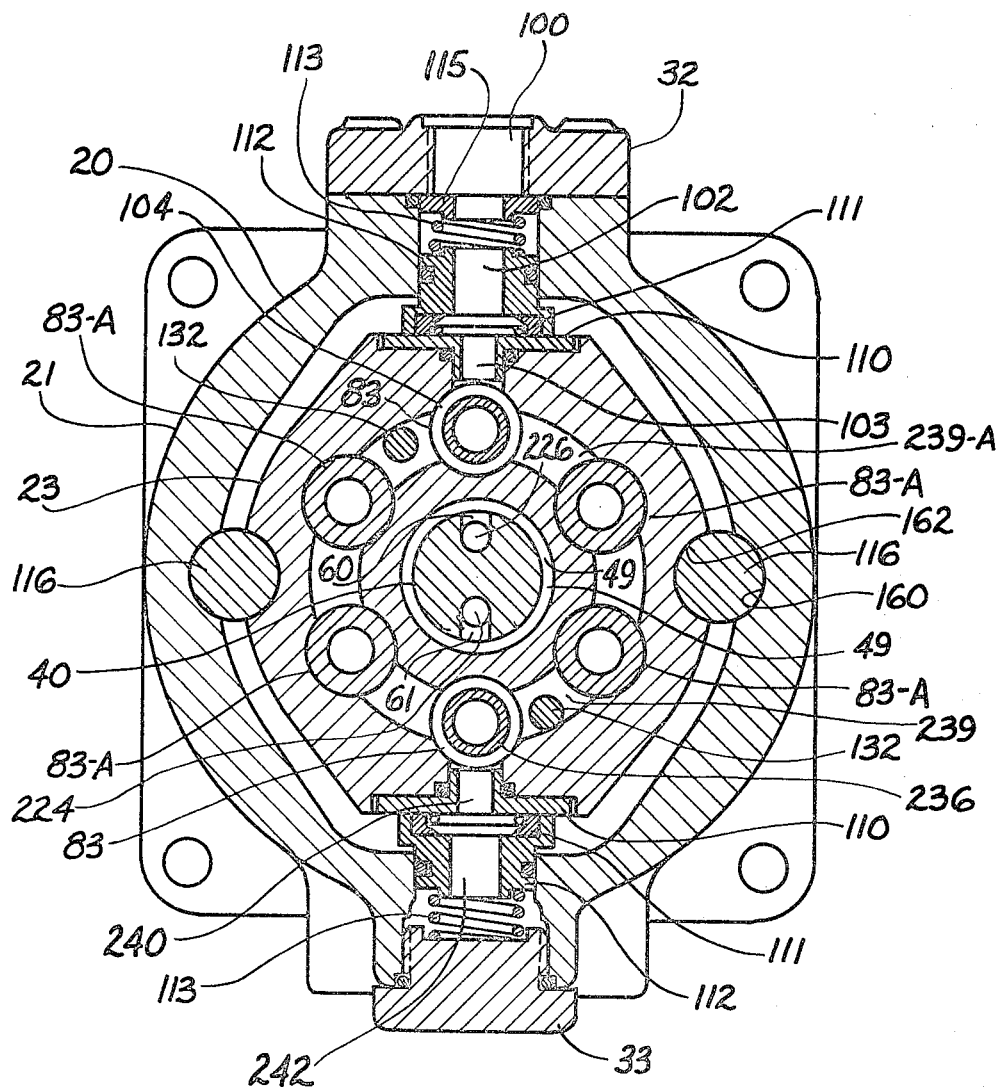
FIG. 6 is an end sectional view of the apparatus shown in FIG. 5, the section being taken along line 6—6 of FIG. 5.
Figure 7:
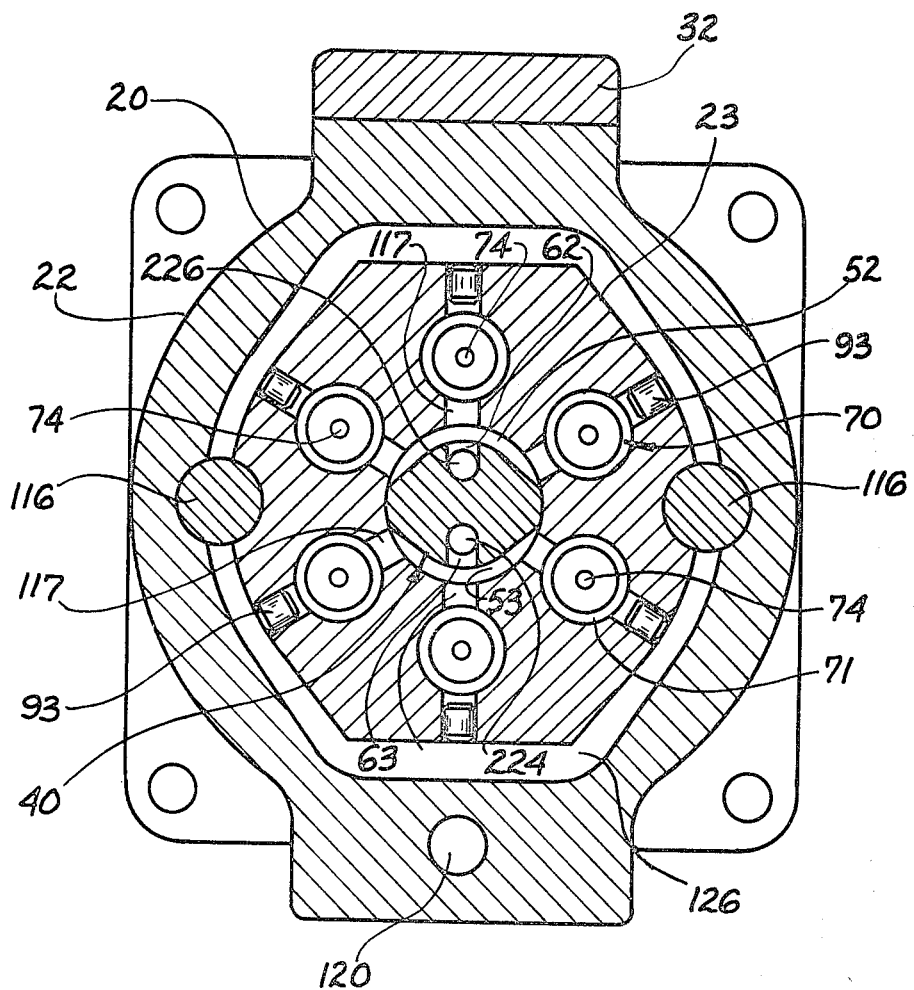
FIG. 7 is another end sectional view of the apparatus shown in FIG. 5, the section being taken along line 7—7 of FIG. 5.
Figure 8:
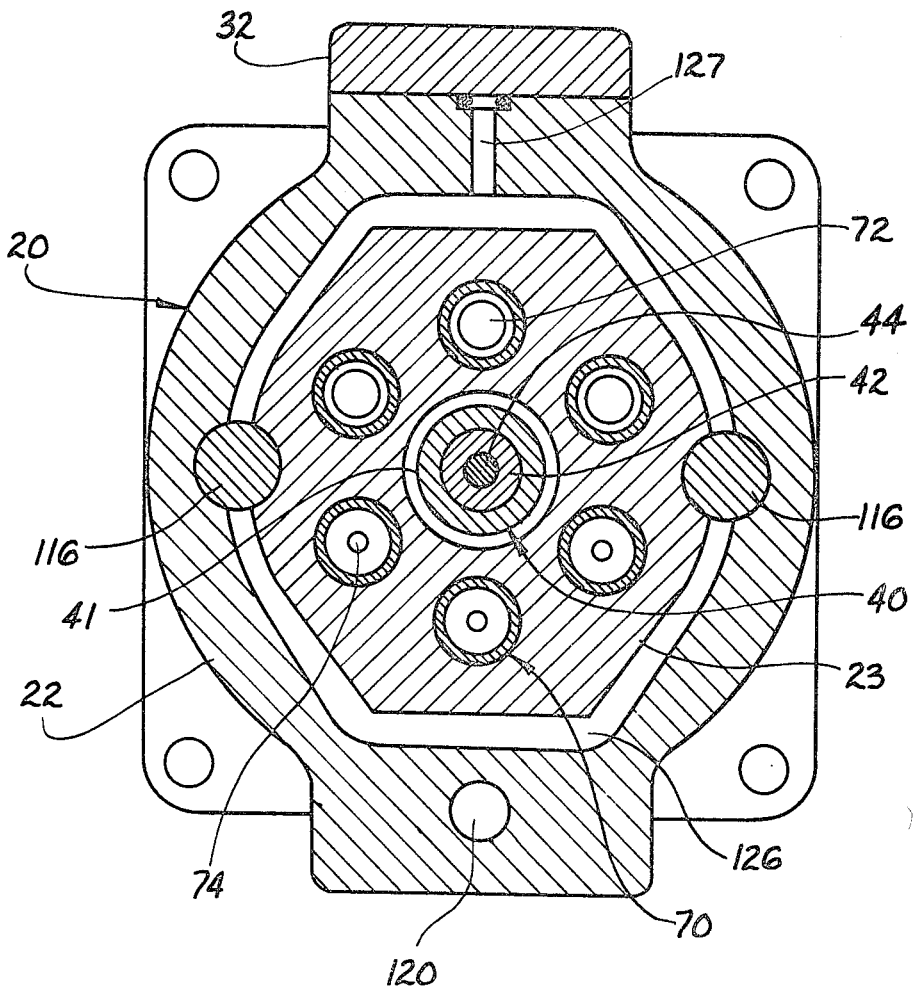
FIG. 8 is still another end sectional view of the apparatus of FIG. 5, the section being taken along line 8—8 of FIG. 5.

As best seen in FIG. 6, a pair of dither pins 132 are slideably disposed in barrel 23 in a bore communicating with annular manifold 239 whereby the ends of pins 132 are subjected to pressurized fluid in the respective manifold 239 and 239-A. These manifolds are formed by reaction plugs 83-A which function as seals to divide an annular manifold chamber into a high pressure manifold 239-A and a low pressure manifold 239. The outer end of pins 132 may be disposed against either reaction plate 81 or the rear wall 22 of housing 20. Dither pins 132 then simply augment the barrel return biasing force of springs 80.

Therefore, it will be understood that vibration or dithering of barrel 23 may be readily accomplished to reduce breakaway friction and prevent hydraulic locking.

Figure 2:
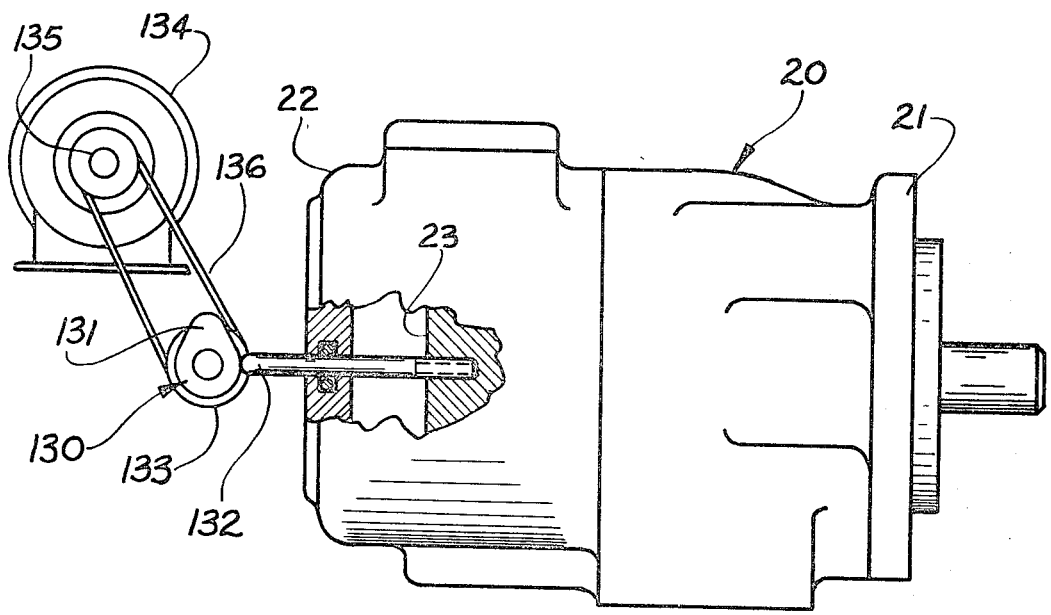
FIG. 2 is a diagrammatic view of a mechanical pulsating means which also may be employed to accomplish the same results as the means illustrated in FIG. 1.

It should be pointed out that cylinder barrel 23 may also be mechanically dithered, if desired, by a mechanical pulsating means indicated generally at 130 in FIG. 2. If this method is used, annular cylinder 29 and piston 24 are replaced by an axially slideable push rod 132 which is extended through a hole in housing 20. Push rod 132 is connected to the end of cylinder barrel 23 and driven by a suitable pulsating prime mover. Such an arrangement would include a motor 134, which drives a first pulley 135 which in turn is connected to a second pulley 133 by a belt 136. An eccentric 131 is operatively connected to second pulley 133 and drives rod 32 and barrel 23.

As again best seen in FIG. 5, piston 70 incorporates the novel structure of inlet port means 73 provided in pistons 70 which communicate with a chamber 290 formed by housing 20 and cylinder barrel 23. Chamber 290 in turn communicates with a housing inlet port 122.

Pistons 70 include a ball check valve 72 disposed in a chamber 180 and spring biased against a valve seat 170. Chamber 180 communicates with a passage 74 formed in piston 70 which in turn communicates with cylinder 92.

During normal operation of the fluid motor, valve 72 remains in the closed position shown in FIG. 5 and the pistons operate in the normal manner.

. However, when a fluid motor must function as a hydraulic brake, the motor must then act as a pump. In this situation, the dangerous condition of overrun may occur if the fluid cannot enter the cylinders fast enough to keep them full and starvation of the cylinders results.

The main reason this overrun condition occurs is the fact that inlet fluid must enter the tortuous passages of the cylinder port timing valve and therefore cannot under stringent circumstances keep up with the demand of the cylinders. Therefore, the load continues to drive the motor shaft and runs away from the supply of fluid to the cylinders.

The novel structure of the piston inlets and check valves relieves this problem by providing a relatively non-restricted inlet passage when the fluid motor must function as a hydraulic brake and therefore as a pump.

This may be best described with reference to FIG. 3 which diagrammatically illustrates a typical pump and fluid motor circuit wherein the fluid motor 20 of the present invention is connected to a variable displacement pump 10.

A typical reversing valve 11 is provided for selectively connecting either of the ports 100 or 121 to the respective pressure recess 48 or 49 to thereby effect reversing of the direction of rotation of fluid motor 20.

Figure 3:
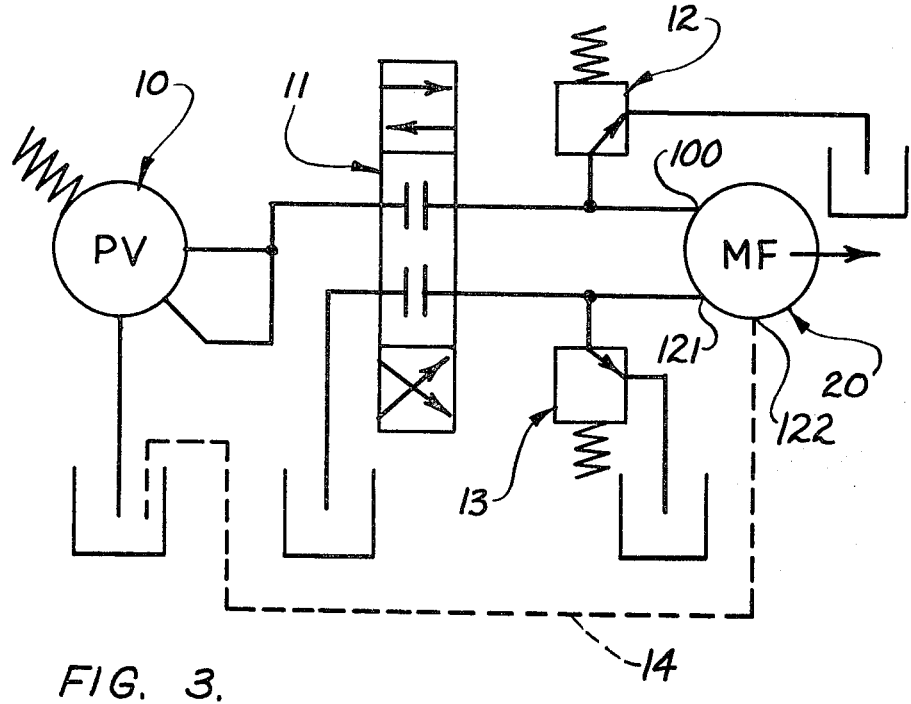
FIG. 3 is a diagrammatic view of a hydraulic system which may be employed with the fluid motor of the present invention.

With continued reference to FIG. 3, a pressure relief valve 12 is provided for shock relief of the pressurized side of the circuit during forward operation of motor 20 and a second pressure relief valve 13 is provided for the same purpose during reverse operation of motor 20.

As seen in FIG. 3, the previously described inlet check valves 72 in the motor pistons 70 are connected to tank by dotted line 14 which communicates with motor inlet port 122. This provides a direct unrestricted source of fluid to the motor cylinders 92 that prevents starvation of the motor during overrun or braking operations.

It will be understood from the foregoing discussion that without the piston inlet means and check valve assembly of the present invention, in order for fluid to enter cylinders 92, it must travel through the tortuous passages of reversing valve 11 and timing valve 40. However, it can readily be seen that this situation is prevented in the fluid motor of the present invention as fluid may relatively freely enter cylinders 92 via line 14, port 122, piston inlet means 73 and passages 74. Check valves 72 are biased in a closed position at a predetermined value such that they will open when a suction condition exists in cylinders 92 to permit fluid at tank pressure to enter piston inlets 73. In this manner the tortuous passages referred to above, which cause starvation and overrun conditions, are eliminated.

Again referring to FIG. 5, the novel construction of the cylinder chamber relief valve means will be described.

Reaction plugs 83 include an auxiliary outlet passage 91 which communicates with a relief outlet passage 90 which in turn communicates with the interior of housing 20.

Passage 91 is closed by means of a ball-check valve assembly 85 which is pressure biased by a spring 141 at a predetermined pressure whereby when the pressure in cylinder 92 rises above the predetermined pressure, valve 85 opens.

This rather simple appearing structure solves a rather serious problem in fluid motors which has, until this time, remained unsolved.

The problem referred to above is the build up of momentary but extremely high pressure in the cylinders which takes place during valving of the cylinder ports during the instantaneous transition period between opening and closing of the successive valve inlets and outlets. This transition period is present in every type of timing valve and this instantaneous high pressure causes fatigue of the cylinder walls in addition to greatly increasing the noise level.

The inclusion of the cylinder chamber relief valves described eliminates this problem. During the transition period between opening and closing of the timing valve, any pressure that builds up above a predetermined value immediately blows open check valve 85 and vents the fluid through passages 91 and 90 into the interior of housing 20. Check valve 85 immediately closes upon the opening of the next valve inlet which, of course, eliminates the excessive pressure in cylinders 92.

It should be pointed out that these pressure build-ups are of instantaneous duration but reach extremely high pressures. Only a small amount of fluid is ever released through passages 91 and 90 and of course relief valve 85 remains open only during the instant transition period between the opening and closing of the timing valve ports.

This same cylinder chamber relief valve construction is even more important when the hydraulic mechanism of the present invention is functioning as a pump.

This is true as the fluid pumped by the pistons 70 must exit through timing valve 40. Then the pressure peaks or build up previously described occurs during the transition period between opening and closing of the valve ports. The relief check valve 85 relieves this problem by venting through passages 90 and 91.

It should be pointed out that the use of the pressure relief valve means in the cylinders and the piston inlet port means and check valve assembly prevents both too high a pressure to build up in cylinders 92 or too low a pressure or vacuum to form in cylinders 92. These low pressure or vacuum conditions are caused by an inadequate fluid supply to the cylinders during pumping functions as previously described.

In operation, the fluid motor of the present invention operates in general exactly as the motor described in my copending application Ser. No. 1,244,091 now Patent No. 3,246,575, except for the important novel differences previously described herein.

Intake port 100 is connected to a pump mechanism and outlet port 121 is connected to reservoir as is housing inlet port 122.

In starting the mechanism of the present invention, it is preferable to use one of the dithering features previously described.

Upon pressurization of intake port 100, fluid enters those of cylinders 92 that are exposed to arcuate pressure recess 48 via the route previously described. This starts the motor by moving the cylinders that are pushing on one side of the eccentric 125 causing rotation of shaft 126 and timing valve member 40. This advances arcuate pressure recess 48 sequentially to successive cylinders which are pressurized to drive their respective pistons toward cam 25.

At the same time arcuate drain recess 49 sequentially communicates with the cylinder drain passages previously described.

It should be pointed out that the fluid motor of the present invention may, if desired, be easily adapted for centrifugal cooling of the barrel in a similar manner as described in my co-pending application Ser. No. 467,168 now Patent No. 3,306,230.

While the form of embodiment of the present invention as herein disclosed constitutes a preferred form, it is to be understood that other forms might be adopted, all coming within the scope of the claims which follow.

I claim:

1. In a fluid motor the combination of a housing; a cylinder barrel disposed in said housing and including a plurality of cylinders and cylinder barrel inlet and outlet ports; a plurality of pistons disposed in said cylinders and including inlet port means communicating with said cylinders; check valve means disposed between said piston inlet port means and said cylinders to permit fluid flow into said cylinders and to prevent fluid flow out of said piston inlet port means; shaft means rotatably supported by said housing and including a cam in driven engagement with said pistons; timing valve means communicating with said cylinders; a plurality of longitudinally extending barrel mounting members supporting said cylinder barrel for axial movement relative to said housing; a barrel driving piston in said barrel driving cylinder and in force transmitting relationship with said cylinder barrel; and means forming a source of pulsating fluid pressure communicating with said inlet passage of said barrel driving cylinder for vibrating said driving piston and barrel relative to said housing.

2. In a fluid motor the combination of a housing; a cylinder barrel disposed in said housing and including a plurality of cylinders and cylinder barrel inlet and outlet ports; a plurality of pistons disposed in said cylinders and including inlet port means communicating with said cylinders; check valve means disposed between said piston inlet port means and said cylinders to permit fluid flow into said cylinders and to prevent fluid flow out of said piston inlet port means; shaft means rotatably supported by said housing and including a cam in driven engagement with said pistons; timing valve means communicating with said cylinders and including a spool valve member provided with a ball portion, a cylinder inlet spool passage, and a cylinder outlet spool passage; a yoke engaging end portions of said pistons and including a central socket portion in which said ball portion is mounted; and a spool reaction pin slideably mounted in said spool valve member and including an inner pin end exposed to pressurized fluid in said cylinder inlet spool passage and an outer pin end in force transmitting relationship with said housing.

3. In a fluid motor the combination of a housing; a cylinder barrel disposed in said housing and including a plurality of cylinders and cylinder barrel inlet and outlet ports; a plurality of pistons disposed in said cylinders and including inlet port means communicating with said cylinders; check valve means disposed between said piston inlet port means and said cylinders to permit fluid flow into said cylinders and to prevent fluid flow out of said piston inlet port means; shaft means rotatably supported by said housing and including a cam in driven engagement with said pistons; timing valve means communicating with said cylinders and including a spool valve member provided with a ball portion, a cylinder inlet spool passage, and a cylinder outlet spool passage; a yoke engaging end portions of said pistons and including a central socket portion in which said ball portion is mounted; and means forming a flexible driving connection between said ball portion of said spool valve member and said shaft means.

4. In a fluid motor the combination of a housing, a cylinder barrel disposed in said housing and including a plurality of cylinders and cylinder barrel inlet and outlet ports, each of said cylinders including auxiliary outlet passage means; a plurality of pistons disposed in said cylinders; high pressure relief valve means in communication with each of said auxiliary outlet passage means; shaft means rotatably supported by said housing and including a cam in driving engagement with said pistons; timing valve means communicating with said cylinders; a plurality of longitudinally extending barrel mounting members supporting said cylinder barrel for axial movement relative to said housing; a barrel driving cylinder formed by said housing means and including an inlet passage; a barrel driving piston in said barrel driving cylinder and in force transmitting relationship with said cylinder barrel; and means forming a source of pulsating fluid pressure communicating with said inlet passage of said barrel driving cylinder for vibrating said driving piston and barrel relative to said housing.

5. In a fluid motor the combination of a housing; a cylinder barrel disposed in said housing and including a plurality of cylinders and cylinder barrel inlet and outlet ports, each of said cylinders including auxiliary outlet passage means; a plurality of pistons disposed in said cylinders; high pressure relief valve means in communication with each of said auxiliary outlet passage means; shaft means rotatably supported by said housing and including a cam in driving engagement with said pistons; timing valve means communicating with said cylinders and including a spool valve member provided with a ball portion, a cylinder inlet spool passage, and a cylinder outlet spool passage; a yoke engaging end portions of said pistons and including a central socket portion in which said ball portion is mounted; and a spool reaction pin slideably mounted in said spool valve member and including an inner pin end exposed to pressurized fluid in said cylinder inlet spool passage and an outer pin end in force transmitting relationship with said housing.

6. In a fluid motor the combination of a housing; a cylinder barrel disposed in said housing and including a plurality of cylinders and cylinder barrel inlet and outlet ports, each of said cylinders including auxiliary outlet passage means; a plurality of pistons disposed in said cylinders; high pressure relief valve means in communication with each of said auxiliary outlet passage means; shaft means rotatably supported by said housing and including a cam in driving engagement with said pistons; timing valve means communicating with said cylinders and including a spool valve member provided with a ball portion, a cylinder inlet spool passage, and a cylinder outlet spool passage; a yoke engaging end portions of said pistons and including a central socket portion in which said ball portion is mounted; and means forming a flexible driving connection between said ball portion of said spool valve member and said shaft means.

7. In a hydraulic machine the combination of a housing; a plurality of cylinders disposed in said housing and including cylinder inlet and outlet ports; a plurality of pistons disposed in said cylinders; a plurality of reaction plugs having inner ends slideably disposed in said cylinders and outer ends freely engaging said housing, said reaction plugs including auxiliary outlet passage means communicating with said cylinders; a check valve disposed in said auxiliary outlet passage means and biased in a closed position, said check valves being opened responsive to a predetermined pressure in said cylinders; shaft means rotatably supported by sadi housing and including a cam in driven engagement with said pistons; and timing valve means in communication with said cylinders.

8. The hydraulic machine defined in claim 7 wherein said housing includes at least two housing inlet ports one of said ports communicating with said timing valve means and the other of said ports communicating with said piston inlet port means.

9. In a fluid motor the combination of a housing; a cylinder barrel disposed in said housing and including a plurality of cylinders and cylinder barrel inlet and outlet ports; a plurality of pistons disposed in said cylinder and including inlet port means communicating with said cylinders; check valve means disposed between said piston inlet port means and said cylinders to permit fluid flow into said cylinders and to prevent fluid flow out of said piston inlet port means; shaft means rotatably supported by said housing and including a cam in driven engagement with said pistons; timing valve means communicating with said cylinders; and pulsating means operatively associated with said cylinder barrel for vibrating said barrel relative to said housing.

10. In a fluid motor the combination of a housing; a cylinder barrel disposed in said housing and including a plurality of cylinders and cylinder barrel inlet and outlet ports; each of said cylinders including auxiliary outlet passage means; a plurality of pistons disposed in said cylinders; high pressure relief valve means in communication with each of said auxiliary outlet passage means; shaft means rotatably supported by said housing and including an eccentric in driving engagement with said pistons; timing valve means communicating with said cylinders; reaction plugs disposed in ends of said cylinders; said auxiliary outlet passage means being formed in said reaction plugs.

References Cited

UNITED STATES PATENTS

| | | | |
|---|---|---|---|
| 2,169,456 | 8/1939 | Wahlmark | 92—71 |
| 3,012,546 | 12/1961 | Heintzmann et al. | 91—452 |
| 3,303,749 | 2/1967 | Ocule | 91—175 |
| 1,817,063 | 8/1931 | Carrie et al. | 103—162 |
| 2,340,100 | 1/1944 | Arndt | 91—175 |
| 2,389,186 | 11/1945 | Dodge | 91—198 |
| 2,553,655 | 5/1951 | Herman et al. | 103—162 |
| 3,037,489 | 6/1962 | Douglas | 91—198 |
| 3,221,564 | 12/1965 | Raymond | 103—162 |

MARTIN P. SCHWADRON, Primary Examiner.

U.S. CL. X.R.

91—180, 441, 451,